United States Patent
Wang et al.

(10) Patent No.: US 11,821,985 B2
(45) Date of Patent: Nov. 21, 2023

(54) MOBILE ROBOT PERFORMING MULTIPLE DETECTIONS USING IMAGE FRAMES OF SAME OPTICAL SENSOR

(71) Applicant: PixArt Imaging Inc., Hsin-Chu County (TW)

(72) Inventors: Guo-Zhen Wang, Hsin-Chu County (TW); Hui-Hsuan Chen, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 345 days.

(21) Appl. No.: 17/342,044

(22) Filed: Jun. 8, 2021

(65) Prior Publication Data

US 2021/0293961 A1  Sep. 23, 2021

Related U.S. Application Data

(60) Continuation-in-part of application No. 17/185,263, filed on Feb. 25, 2021, now Pat. No. 11,307,308, and
(Continued)

(51) Int. Cl.
*G01S 17/66* (2006.01)
*G01S 17/50* (2006.01)
(Continued)

(52) U.S. Cl.
CPC ............ *G01S 17/66* (2013.01); *G01S 7/4808* (2013.01); *G01S 7/4815* (2013.01);
(Continued)

(58) Field of Classification Search
CPC .......... G01S 17/66; G01S 17/46; G01S 17/50; G01S 17/48; G01S 17/08; G01S 7/4808;
(Continued)

(56) References Cited

U.S. PATENT DOCUMENTS

| 4,954,962 A | 9/1990 | Evans, Jr. et al. |
| 5,247,173 A | 9/1993 | Benchetrit et al. |

(Continued)

FOREIGN PATENT DOCUMENTS

| TW | 201443710 A | 11/2014 |
| TW | I461972 B | 11/2014 |

OTHER PUBLICATIONS

Apostolopoulos et al., "Mobile Robot for Automatic Installation of Floor Tiles", Apr. 1996, IEEE, International Conference on Robotics and Automation Minneapolis, Minnesota, pp. 3652-3657(Year: 1996).

*Primary Examiner* — Khoi H Tran
*Assistant Examiner* — Nhi Q Bui
(74) *Attorney, Agent, or Firm* — WPAT, P.C

(57) ABSTRACT

There is provided a mobile robot that performs the obstacle avoidance and visual simultaneous localization and mapping (VSLAM) according to image frames captured by the same optical sensor. The mobile robot includes a pixel array and a processor. An upper part of the pixel array is not coated with any filter and a lower part of the pixel array is coated with an IR filter. The processor performs range estimation using pixel data corresponding to the lower part of the pixel array, and perform the VSLAM using pixel data corresponding to the upper part of the pixel array.

17 Claims, 8 Drawing Sheets

Related U.S. Application Data a continuation-in-part of application No. 16/929,232, filed on Jul. 15, 2020, now Pat. No. 11,691,264, and a division of application No. 16/800,187, filed on Feb. 25, 2020, now Pat. No. 10,962,646, and a continuation-in-part of application No. 16/425,955, filed on May 30, 2019, now Pat. No. 11,510,539, and a continuation of application No. 15/841,376, filed on Dec. 14, 2017, now Pat. No. 10,627,518, and a continuation-in-part of application No. 15/841,376, filed on Dec. 17, 2017, now Pat. No. 10,627,518.

(60) Provisional application No. 62/514,349, filed on Jun. 2, 2017.

(51) Int. Cl.

| | | |
|---|---|---|
| *G06T 7/521* | (2017.01) | |
| *G01S 7/481* | (2006.01) | |
| *G01S 17/46* | (2006.01) | |
| *G01S 7/48* | (2006.01) | |
| *H04N 23/51* | (2023.01) | |
| *H04N 23/56* | (2023.01) | |
| *H04N 5/33* | (2023.01) | |
| *G01S 17/48* | (2006.01) | |
| *G01S 17/08* | (2006.01) | |

(52) U.S. Cl.
CPC ............ *G01S 7/4816* (2013.01); *G01S 17/46* (2013.01); *G01S 17/50* (2013.01); *G06T 7/521* (2017.01); *H04N 23/51* (2023.01); *H04N 23/56* (2023.01); *G01S 17/08* (2013.01); *G01S 17/48* (2013.01); *G06T 2207/10004* (2013.01); *G06T 2207/10152* (2013.01); *H04N 5/33* (2013.01)

(58) Field of Classification Search
CPC ...... G01S 7/4815; G01S 7/4816; G01S 7/254; G06T 7/521; G06T 2207/10004; G06T 2207/10152; G06T 2207/20021; G06T 2207/30241; G06T 2207/30261; G06T 2207/10048; G06T 2207/20224; H04N 23/51; H04N 23/56; H04N 23/33; A47L 9/2805; A47L 9/30; A47L 11/4011; A47L 2201/04; G05D 2201/0203; G05D 2201/0215; G05D 1/0248; G05D 1/0274
See application file for complete search history.

(56) References Cited

U.S. PATENT DOCUMENTS

| | | | |
|---|---|---|---|
| 9,632,505 | B2 * | 4/2017 | Hickerson ............ G05D 1/0246 |
| 2002/0085116 | A1 | 7/2002 | Kuwano et al. |
| 2005/0206617 | A1 | 9/2005 | Moyer et al. |
| 2008/0260262 | A1 | 10/2008 | Lim et al. |
| 2010/0123655 | A1 | 5/2010 | Lai |
| 2011/0176709 | A1 | 7/2011 | Park et al. |
| 2012/0019677 | A1 * | 1/2012 | Wong ................. H04N 23/6811 348/208.99 |
| 2012/0162072 | A1 | 6/2012 | Chen et al. |
| 2013/0072771 | A1 | 3/2013 | Gu et al. |
| 2013/0127714 | A1 | 5/2013 | Gu et al. |
| 2013/0127721 | A1 | 5/2013 | Gu et al. |
| 2013/0127722 | A1 | 5/2013 | Gu et al. |
| 2013/0131474 | A1 | 5/2013 | Gu et al. |
| 2013/0138247 | A1 * | 5/2013 | Gutmann ................ G01S 17/06 901/1 |
| 2013/0184865 | A1 | 7/2013 | Guo et al. |
| 2013/0215257 | A1 | 8/2013 | Huang et al. |
| 2014/0323835 | A1 | 10/2014 | Kao |
| 2015/0009146 | A1 | 1/2015 | Song |
| 2015/0160743 | A1 | 6/2015 | Song et al. |
| 2015/0168954 | A1 | 6/2015 | Hickerson et al. |
| 2016/0119747 | A1 | 4/2016 | Ryan et al. |
| 2016/0238773 | A1 | 8/2016 | Shei et al. |
| 2016/0288330 | A1 * | 10/2016 | Konolige ............. H04N 13/239 |
| 2016/0306446 | A1 | 10/2016 | Chung et al. |
| 2016/0345847 | A1 | 12/2016 | Gu et al. |
| 2017/0061226 | A1 | 3/2017 | Kok et al. |
| 2017/0076442 | A1 | 3/2017 | Schoenmeyer et al. |
| 2017/0076521 | A1 | 3/2017 | Chuang et al. |
| 2019/0113606 | A1 * | 4/2019 | Mathy ................. H04N 13/128 |
| 2020/0241550 | A1 | 7/2020 | Lin et al. |

* cited by examiner

MOBILE ROBOT PERFORMING MULTIPLE DETECTIONS USING IMAGE FRAMES OF SAME OPTICAL SENSOR

RELATED APPLICATIONS

This application is a continuation-in-part application of U.S. patent application Ser. No. 16/929,232 filed on Jul. 15, 2020, which is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No. U.S. 62/514,349, filed on Jun. 2, 2017, the disclosures of which are hereby incorporated by reference herein in their entirety.

This application is also a continuation-in-part application of U.S. patent application Ser. No. 17/185,263 filed on Feb. 25, 2021, which is a divisional application of U.S. application Ser. No. 16/800,187, filed on Feb. 25, 2020, which is a continuation application of U.S. application Ser. No. 15/841,376, filed on Dec. 14, 2017, which claims the priority benefit of U.S. Provisional Application Ser. No. U.S. 62/514,349, filed on Jun. 2, 2017, the disclosures of which are hereby incorporated by reference herein in their entirety.

BACKGROUND

1. Field of the Disclosure

This disclosure generally relates to a mobile robot and, more particularly, to a mobile robot that performs the obstacle avoidance, positioning and object recognition according to image frames captured by the same optical sensor corresponding to lighting of different light sources.

2. Description of the Related Art

The smart home is one part of developing a smart city, and a cleaning robot has almost become one standard electronic product in a smart home. Generally, the cleaning robot is arranged with multiple functions to improve the user experience, e.g., including mapping of an operation area, obstacle detection and avoidance during operation. The current cleaning robot is employed with multiple types of sensors to perform these different detecting functions.

For example, the cleaning robot includes a sensor arranged at a top surface thereof to implement the visual simultaneous localization and mapping (VSLAM) by capturing images above the path by which the cleaning robot passes. In addition, the cleaning robot further adopts a front sensor to implement the obstacle detection and avoidance by capturing images in front of a moving direction of the mobile robot.

That is, the conventional cleaning robot needs multiple sensors to perform different detecting functions.

Accordingly, the present disclosure provides a mobile robot that performs the obstacle avoidance, positioning and object recognition according to the image frames captured by the same one optical sensor corresponding to lighting of different light sources.

SUMMARY

The present disclosure provides a mobile robot that performs the obstacle avoidance according to the image frame captured by an optical sensor when a laser diode is emitting light, and performs the visual simultaneous localization and mapping (VSLAM) according to the image frame captured by the optical sensor when a light emitting diode is emitting light.

The present disclosure provides a mobile robot including a first light source, an optical sensor and a processor. The first light source is configured to project a transverse light section toward a moving direction at a first time interval. The optical sensor is configured to capture a first image frame within the first time interval, and includes a pixel array. An upper part of the pixel array is not coated with any filter and a lower part of the pixel array is coated with an IR pass filter. The processor is electrically coupled to the first light source and the optical sensor, and configured to perform range estimation using pixel data corresponding to the lower part of the pixel array, and perform visual simultaneous localization and mapping (VSLAM) using pixel data corresponding to the upper part of the pixel array.

The present disclosure further provides a mobile robot including a first light source, a third light source, an optical sensor and a processor. The first light source is configured to project a transverse light section toward a moving direction at a first time interval. The third light source is configured to illuminate a front area of the moving direction. The optical sensor is configured to capture a first image frame within the first time interval, and includes a pixel array. An upper part of the pixel array is not coated with any filter and a lower part of the pixel array is coated with an IR pass filter. The processor, electrically coupled to the first light source, the third light source and the optical sensor, and configured to perform range estimation using pixel data corresponding to the lower part of the pixel array, perform visual simultaneous localization and mapping (VSLAM) using pixel data corresponding to the upper part of the pixel array, and identify ambient light intensity using the pixel data corresponding to the upper part of the pixel array.

In the present disclosure, the mobile robot realizes multiple detecting functions by using a single optical sensor incorporating with different light sources activating at different times.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The mobile robot of the present disclosure is to operate using a single optical sensor incorporating with different light sources. The linear light source is used to find an obstacle and measure a distance of the obstacle as a reference for turning a moving direction of the robot. The illumination light source is used to illuminate a front area for the visual simultaneous localization and mapping (VSLAM) and the object recognition.

Figure 1A:
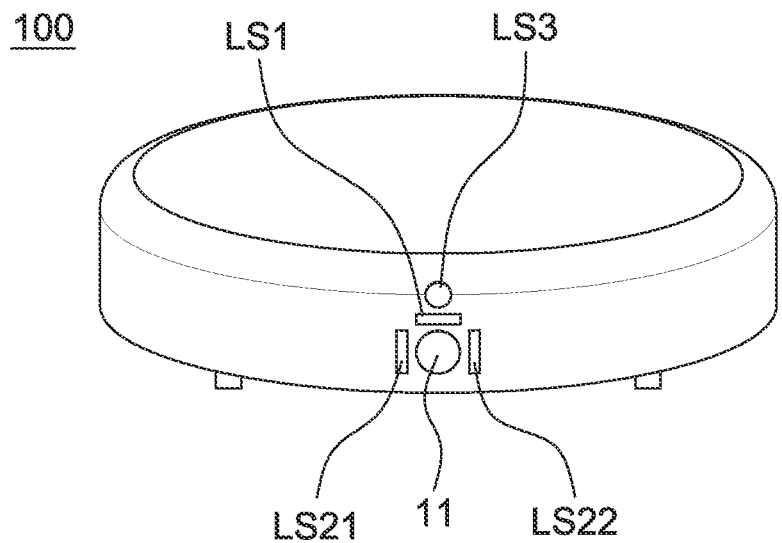
FIG. 1A is a schematic diagram of a mobile robot according to one embodiment of the present disclosure.

Referring to FIG. 1A, it is a schematic diagram of a mobile robot 100 according to one embodiment of the present disclosure. FIG. 1A shows that the mobile robot 100 is a cleaning robot, but the present disclosure is not limited thereto. The mobile robot 100 is any electronic robot that moves according to the imaging result to perform the transportation, communication and guiding.

Figure 1B:
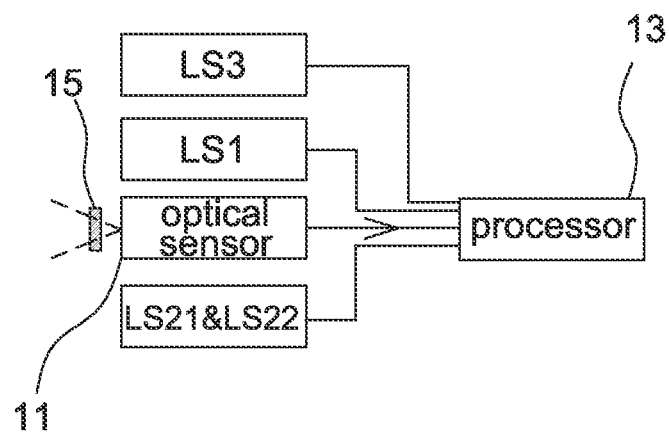
FIG. 1B is a schematic block diagram of elements of a mobile robot according to one embodiment of the present disclosure.

Please referring to FIG. 1B together, it is a schematic block diagram of a mobile robot 100 according to one embodiment of the present disclosure. The mobile robot 100 includes a first light source LS1, second light sources LS21 and LS22, a third light source LS3, an optical sensor 11 and a processor 13. The processor 13 is an application specific integrated circuit (ASIC) or a micro controller unit (MCU) that implements its functions using software, hardware and/or firmware. Although FIG. 1B shows two second light sources, it is only intended to illustrate but not to limit the present disclosure. The mobile robot 100 may include only one second light source.

The first light source LS1 includes, for example, a laser light source and a diffractive optical element. The diffractive optical element causes light emitted by the laser light source to generate a transverse projecting light after passing thereby such that the first light source LS1 projects a transverse light section toward a moving direction. The moving direction is along a side arranging the first light source LS1, the second light sources LS21 and LS22, the third light source LS3 and the optical sensor 11.

The second light sources LS21 and LS22 respectively include, for example, a laser light source and a diffractive optical element. The diffractive optical element causes light emitted by the laser light source to generate a longitudinal projecting light after passing thereby such that the second light sources LS21 and LS22 respectively project a longitudinal light section toward the moving direction.

In the present disclosure, the laser light source is, for example, an infrared laser diode (IR LD).

The third light source LS3 is, for example, an IR light emitting diode (LED), and used to illuminate a front area of the moving direction. An area illuminated by the third light source LS3 is preferably larger than or equal to a field of view of the optical sensor 11. In the present disclosure, when the third light source LS3 is lighted up, the first light source LS1 as well as the second light sources LS21 and LS22 are turned off.

Figure 2:
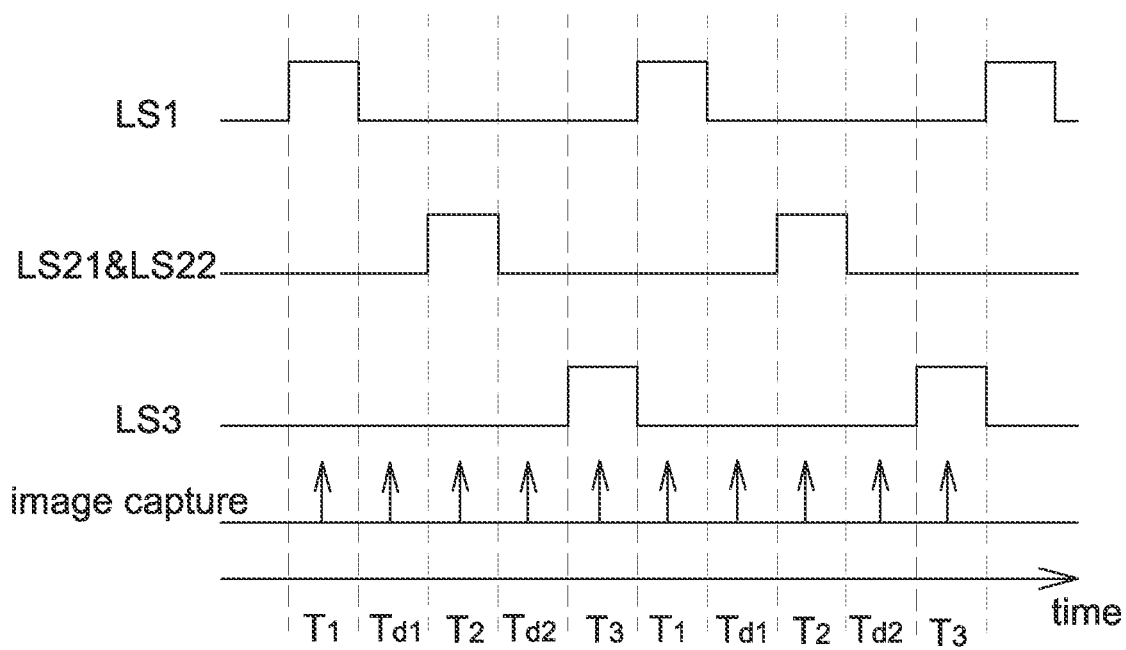
FIG. 2 is an operational timing diagram of a mobile robot according to a first embodiment of the present disclosure.

Please referring to FIG. 2, it is an operational timing diagram of a mobile robot 100 according to a first embodiment of the present disclosure. The first light source LS1 projects a transverse light section toward the moving direction at a first time interval T1. The second light sources LS1 and LS2 respectively project a longitudinal light section toward the moving direction at a second time interval T2. The third light source LS3 illuminates a front area of the moving direction at a third time interval T3.

Figure 6A:
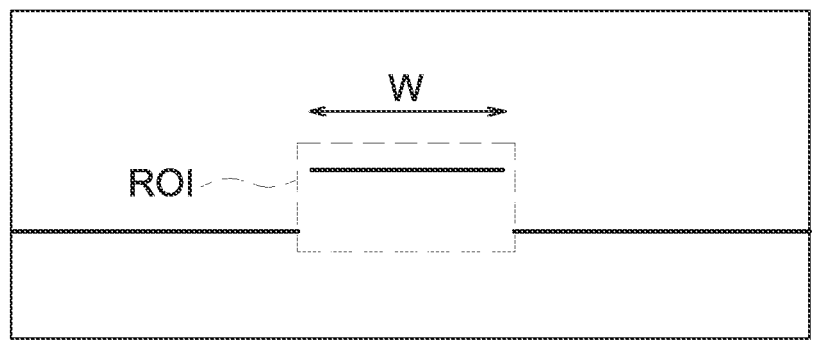
FIG. 6A is a schematic diagram of an image frame associated with a first light source and captured by an optical sensor of a mobile robot according to one embodiment of the present disclosure.
Figure 6B:
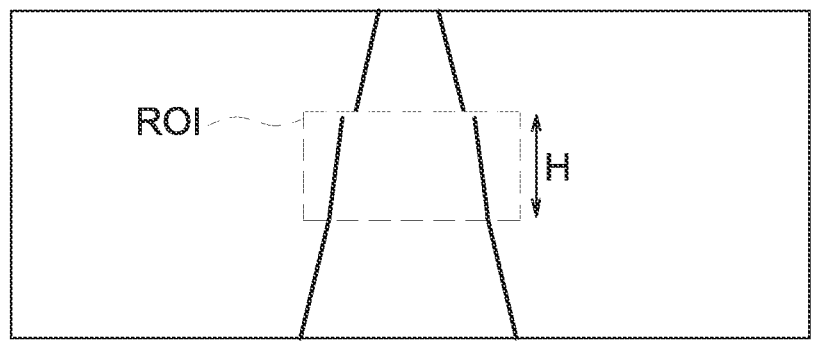
FIG. 6B is a schematic diagram of an image frame associated with a second light source and captured by an optical sensor of a mobile robot according to one embodiment of the present disclosure.

The optical sensor 11 is, for example, a CCD image sensor or a CMOS image sensor that captures a first image frame, a second image frame and a third image frame respectively within the first time interval T1, the second time interval T2 and the third time interval T3 using a sampling frequency. When the first image frame contains an obstacle, the first image frame has a broken line as shown in FIG. 6A; whereas, when the first image frame does not contain any obstacle, the first image frame only has a continuous (no broken line) transverse line. When the second image frame contains an obstacle, the second image frame has at least one broken line as shown in FIG. 6B, wherein an angle of the broken line is determined according a shape of obstacle and not limited to that shown in FIG. 6B; whereas, when the second image frame does not contain any obstacle, the second image frame only has two continuous (no broken line) tilted line. It is appreciated that FIGS. 6A and 6B are only intended to illustrate but not to limit the present disclosure.

It is appreciated that as the second light sources LS21 and LS22 project two parallel light sections on a moving surface, in the second image frame captured by the optical sensor 11, two parallel light sections present tilted lines. In addition, FIG. 6B only shows projected light sections on the moving surface captured by the optical sensor 11. When there is a wall in front of the mobile robot 100, the upper part of the second image frame will appear two parallel longitudinal light sections projected by the second light sources LS21 and LS22.

The position of broken line in the image frame reflects a position of the obstacle in front of the mobile robot 100. As long as the relationship between the position of broken line in the image frame and the actual distance of obstacles is previously recorded, a distance of one obstacle from the mobile robot 100 is obtainable when an image frame containing a broken line is captured.

As shown in FIG. 6A, the processor 13 already knows a predetermined distance from a transverse light section projected in front of the mobile robot 100 by the first light source LS1. Using the triangulation, the processor 13 calculates the distance and width of an obstacle when a broken line appears in an image of the transverse light section.

As shown in FIG. 6B, the processor 13 already knows longitudinal light sections being projected in front of the mobile robot 100 by the second light sources LS21 and LS22. Using the triangulation, the processor 13 calculates the distance and height of an obstacle according to a position and length in an image of the longitudinal light sections (i.e., tilted line) when at least one broken line appears in the image of the longitudinal light sections.

The processor 13 is electrically coupled to the first light source LS1, the second light sources LS21 and LS22, the third light source LS3 and the optical sensor 11, and used to control ON/OFF of light sources and the image capturing. The processor 13 further performs the range estimation according to the first image frame (e.g., FIG. 6A) and the second image frame (e.g., FIG. 6B), and performs the VSLAM according to the third image frame (containing object images actually being acquired), wherein details of the VSLAM are known to the art and thus are not described herein. The present disclosure is to execute different detections according to image frames captured by the same optical sensor 11 corresponding to the lighting of different light sources.

Referring to FIG. 2 again, the optical sensor 11 further captures a first dark image frame within a first dark interval Td1 of first light source behind the first time interval T1. The first dark image frame is used for differencing with the first image frame. The optical sensor 11 further captures a second dark image frame within a second dark interval Td2 of second light source behind the second time interval T2. The second dark image frame is used for differencing with the second image frame. For example, the processor 13 subtracts the first dark image frame from the first image frame, and subtracts the second dark image frame from the second image frame to eliminate background noises.

Although FIG. 2 shows that the first dark interval Td1 is behind the first time interval T1 and the second dark interval Td2 is behind the second time interval T2, the present disclosure is not limited thereto. In other aspects, the first dark interval Td1 is arranged prior to the first time interval T1 and the second dark interval Td2 is arranged prior to the second time interval T2. In another aspect, the optical sensor 11 captures only one dark image frame (e.g., prior to T1, between T1 and T2 or behind T2) within every cycle (e.g., an interval sequentially lighting every light source). The processor 13 subtracts the dark image frame from the first image frame and subtracts the dark image frame (the same one) from the second image frame. In this way, background noises are also cancelled and the total frame rate is increased.

In one aspect, the optical sensor 11 includes a pixel array. All pixels of the pixel array receive incident light via an IR light filter. For example, FIG. 1B shows that an IR pass filter 15 is further arranged in front of the optical sensor 11. The IR pass filter 15 is formed with an optics (e.g., coating on a lens) in front of the pixel array, or directly arranged upon every pixel of the pixel array.

Figure 3:
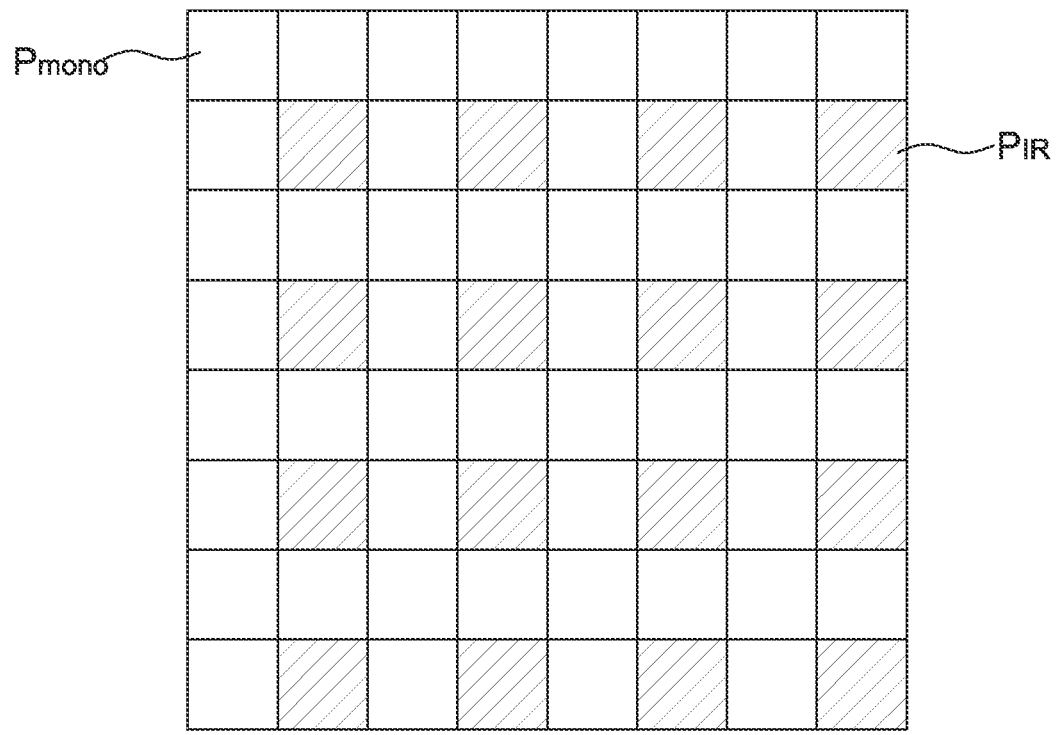
FIG. 3 is a schematic diagram of a pixel array of a mobile robot according to one embodiment of the present disclosure.

In another aspect, the pixel array of the optical sensor 11 includes a plurality of first pixels $P_{IR}$ and a plurality of second pixels $P_{mono}$, as shown in FIG. 3. The first pixels $P_{IR}$ are IR pixels, i.e. receiving incident light via a IR pass filter/film. The second pixels $P_{mono}$ receive incident light without via a IR pass filter/film. Preferably, the second pixels $P_{mono}$ receive incident light without passing any filter element. The incident light is referred to reflected light from the floor, wall and object in front of the mobile robot 100.

In the aspect including two pixel types, the first image frame and the second image frame mentioned above are formed by pixel data generated by the plurality of first pixels $P_{IR}$. That is, the processor 13 performs the range estimation only according to pixel data generated by the plurality of first pixels $P_{IR}$. The third image frame mentioned above is formed by pixel data generated by both the plurality of first pixels $P_{IR}$ and the plurality of second pixels $P_{mono}$ since the first pixels $P_{IR}$ and the second pixels $P_{mono}$ both detect infrared light when the third light source LS3 is emitting light. The processor 13 is arranged to process the pixel data corresponding to the lighting of different light sources.

In one aspect, the plurality of first pixels $P_{IR}$ and the plurality of second pixels $P_{mono}$ of the pixel array are arranged as a chessboard pattern as shown in FIG. 3. In other aspects, the first pixels $P_{IR}$ and the second pixels $P_{mono}$ are arranged in other ways, e.g., a left part or an upper part of the pixel array is arranged with the first pixels $P_{IR}$, and a right part or a lower part of the pixel array is arranged with the second pixels $P_{mono}$, but not limited thereto.

In the aspect that the first pixels $P_{IR}$ and the second pixels $P_{mono}$ are arranged in a chessboard pattern, the processor 13 further performs the pixel interpolation on the first image frame and the second image frame at first so as to fill interpolated data at positions in the first image frame and the second image frame corresponding the second pixels $P_{mono}$. After the pixel interpolation, the range estimation is performed.

When the pixel array of the optical sensor 11 is arranged as the chessboard pattern, the mobile robot 100 of the present disclosure may operate in another way to increase the frame rate of the range estimation and positioning (e.g., using VSLAM). In the aspect of FIG. 2, the frame rate of the range estimation and positioning is ⅕ of the sampling frequency of the optical sensor 11.

Figure 4:
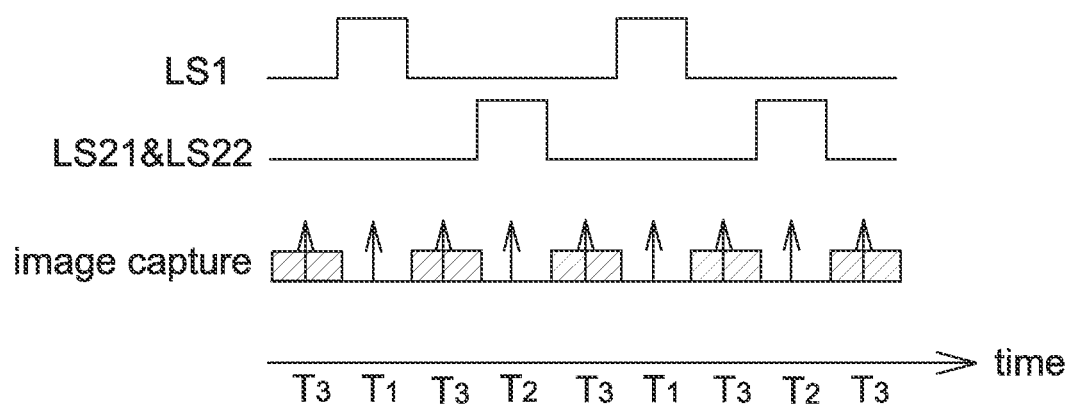
FIG. 4 is an operational timing diagram of a mobile robot according to a second embodiment of the present disclosure.

Referring to FIG. 4, it is an operational timing diagram of a mobile robot 100 according to a second embodiment of the present disclosure. The first light source LS1 projects a transverse light section toward the moving direction within a first time interval T1. The second light sources LS21 and LS22 respectively project a longitudinal light section toward the moving direction within a second time interval T2.

The pixel array of the optical sensor 11 captures a first image frame, a second image frame and a third image frame respectively within the first time interval T1, the second time interval T2 and a third time interval T3 between the first time interval T1 and the second time interval T2. That is, when the pixel array of the optical sensor 11 captures the third image frame, all light sources are not turned on. In FIG. 4, the third time interval T3 is shown by rectangular regions filled with slant lines.

The processor 13 performs the range estimation (e.g., including finding an obstacle and calculating a distance therefrom) according to the first image frame and the second image frame, wherein the first image frame and the second image frame are formed by pixel data generated by the plurality of first pixels $P_{IR}$. That is, when the first light source LS1 as well as the second light sources LS21 and LS22 are lighted up, pixel data associated with the first pixels $P_{IR}$ is not influenced by other colors of light, and thus the processor 13 is arranged to perform the range estimation according to the pixel data only associated with the plurality of first pixels $P_{IR}$.

In this embodiment, the third image frame is formed by pixel data generated by the plurality of second pixels $P_{mono}$.

Similarly, the processor 13 further performs the pixel differencing between the first image frame and the pixel data in the third image frame associated with the first pixels $P_{IR}$, and performs the pixel differencing between the second image frame and the pixel data in the third image frame associated with the first pixels $P_{IR}$ so as to eliminate background noises.

Similarly, when the first pixels $P_{IR}$ and the second pixels $P_{mono}$ are arranged in the chessboard pattern, before performing the range estimation, the processor 13 further performs the pixel interpolation on the first image frame and the second image frame to fill interpolated data at positions in the first image frame and the second image frame corresponding to the second pixels $P_{mono}$ at first. Then, the range estimation is performed.

In the second embodiment, the processor 13 performs the VSLAM according to pixel data in the third image frame associated with the second pixels $P_{mono}$. In this embodiment, the third light source LS3 is not lighted (e.g., the third light source LS3 may be omitted). Since the pixel data generated by the first pixels $P_{IR}$ exclude components outside IR spectrum, the third image frame of this embodiment is formed by pixel data generated by the plurality of second pixels $P_{mono}$. In addition, before performing the VSLAM according to the third image frame, the processor 13 further performs the pixel interpolation on the third image frame so as to fill interpolated data at positions in the third image frame corresponding to the first pixels $P_{IR}$.

It is seen from FIG. 4 that a frame rate of the range estimation is increased to ¼ (e.g., a frame period including T1+T2+2×T3) of the sampling frequency of the optical sensor 11, and a frame rate of the VSLAM is increased to ½ of the sampling frequency of the optical sensor 11.

However, when ambient light is not enough, the processor 13 may not able to correctly perform the VSLAM without lighting the third light source LS3. To solve this problem, the processor 13 further identifies ambient light strength according to the third image frame, e.g. comparing with a brightness threshold. When identifying that the ambient light is weak, the processor 13 further changes the lighting timing of the first light source LS1 as well as the second light sources LS21 and LS22. For example, the processor 13 controls the lighting of light sources and the image capturing as shown in FIG. 2. That is, under strong ambient light (e.g., an average brightness of the third image frame larger than a brightness threshold), the mobile robot 100 operates using the timing of FIG. 4; whereas under weak ambient light (e.g., the average brightness of the third image frame smaller than the brightness threshold), the mobile robot 100 operates using the timing of FIG. 2.

The present disclosure further provides a mobile robot that performs the ranging estimation and obstacle recognition according to images captured by the same optical sensor 11. When identifying that one obstacle is a specific object, e.g., a wire or socks, the mobile robot 100 directly moves across the obstacle; whereas when identifying that one obstacle is an electronic device, e.g., a cell phone, the mobile robot 100 dodges the electronic device without moving across it. The obstacle that can be moved across is determined previously according to different applications.

The mobile robot 100 of this embodiment is also shown as FIGS. 1A and 1B including a first light source LS1, second light sources LS21 and LS22, a third light source LS3, an optical sensor 11 and a processor 13. For example referring to FIG. 4, the first light source LS1 projects a transverse light section toward the moving direction within a first time interval T1; the second light sources LS21 and LS22 respectively project a longitudinal light section toward the moving direction within a second time interval T2. The third light source LS3 is used to illuminate a front area of the moving direction.

As mentioned above, to cancel the interference from ambient light, the optical sensor 11 further captures a first dark image frame, for differencing with the first image frame, within a first dark interval (e.g., T3 in FIG. 4) of first light source prior to or behind the first time interval T1; and captures a second dark image frame, for differencing with the second image frame, within a second dark interval (e.g., T3 in FIG. 4) of second light source prior to or behind the second time interval T2. The optical sensor 11 respectively captures the first image frame and the second image frame within the first time interval T1 and the second time interval T2.

In this embodiment, the pixel array of the optical sensor 11 receives incident light via the light filter 15.

The processor 13 identifies an obstacle according to the first image frame and the second image frame, wherein the method of identifying the obstacle has been described above and thus details thereof are not repeated herein. After the obstacle is found, the processor 13 controls the third light source LS3 to light up within a third time interval (e.g., T3 in FIG. 2) and controls the optical sensor 11 to capture a third image frame within the third time interval.

In this embodiment, before appearance of the obstacle is identified by the processor 13, the third light source LS3 is not lighted up, and thus the operational timing of the mobile robot 100 is shown as FIG. 4. When identifying that any obstacle appears, the processor 13 controls the third light source LS3 to emit light and controls the optical sensor 11 to capture one third image frame during the third light source LS3 is emitting light. In other aspects, more than one third image frame may be captured. In the present disclosure, capturing one third image frame is taken as an example for illustration. In this embodiment, the third image frame is for the object recognition using a pre-trained learning model.

After receiving the third image frame from the optical sensor 11, the processor 13 determines a region of interest (ROI) in the third image frame according to a position of obstacle (i.e. the position of broken line), e.g., shown in FIGS. 6A and 6B. As the present disclosure uses a single optical sensor, after the processor 13 identifies a position of obstacle and determines the ROI according to the first image frame and the second image frame, the ROI directly maps to a corresponding region in the third image frame.

In one non-limiting aspect, the ROI has a predetermined image size. That is, when the position (e.g., center or gravity center, but not limited to) of one obstacle is determined, the processor 13 determines a region of interest having the predetermined size at the position.

In another aspect, a size of the ROI is determined by the processor 13 according to the first image frame and the second image frame. In this case, when the obstacle is larger, the ROI is larger; on the contrary, the ROI is smaller.

The processor 13 then recognizes an object type of the obstacle in the ROI using a pre-trained learning model (e.g., embedded in the processor 13 by means of ASIC or firmware). As the learning model does not recognize (e.g., not calculating convolution) rest region in the third image frame outside the ROI, the computation loading, time and power consumption are significantly reduced. Meanwhile, as the ROI contains a small number of object images, the recognition is not interfered by other object images to improve the recognition correctness.

In addition, to further improve the recognition correctness, the processor 13 further identifies a height of obstacle according to the second image frame, e.g., taking a length H of the broken line in FIG. 6B as the height of an obstacle. The learning model further recognizes the object type according to the object height.

In one aspect, the object height is used as the learning material by the data network architecture (e.g., including neural network learning algorithm, deep learning algorithm, but not limited to) together with the ground truth image in a training phase to generate the learning model.

In another aspect, in the training phase, the data network architecture only uses the ground truth image to generate the learning model. In operation, when the learning model calculates the probability of several possible objects, the height is used to filter some possible objects. For example, if the height of one object type categorized by the learning model exceeds the height identified according to the second image frame, even though this one object type has the highest probability, the learning model still excludes this object type.

The method of categorizing the object in an image by the learning model is known to the art, and thus details thereof are not described herein. Meanwhile, the incorporation between the learning model and the object height to recognize the obstacle is not limited to that described in the present disclosure.

In one aspect, as a capturing frequency of the optical sensor 11 is higher than a moving speed of the mobile robot 100, the processor 13 further controls the first light source LS1, the second light sources LS21 and LS22, and the third light source LS3 to turn off for a predetermined time interval after the third time interval T3 (i.e. after capturing one third image frame) till the obstacle leaves the projection range of the first light source LS1. In this way, it is able to prevent repeatedly recognizing the same obstacle. The predetermined time interval is determined according to, for example, the moving speed of the mobile robot 100 and the height determined according to the second image frame.

Figure 5:
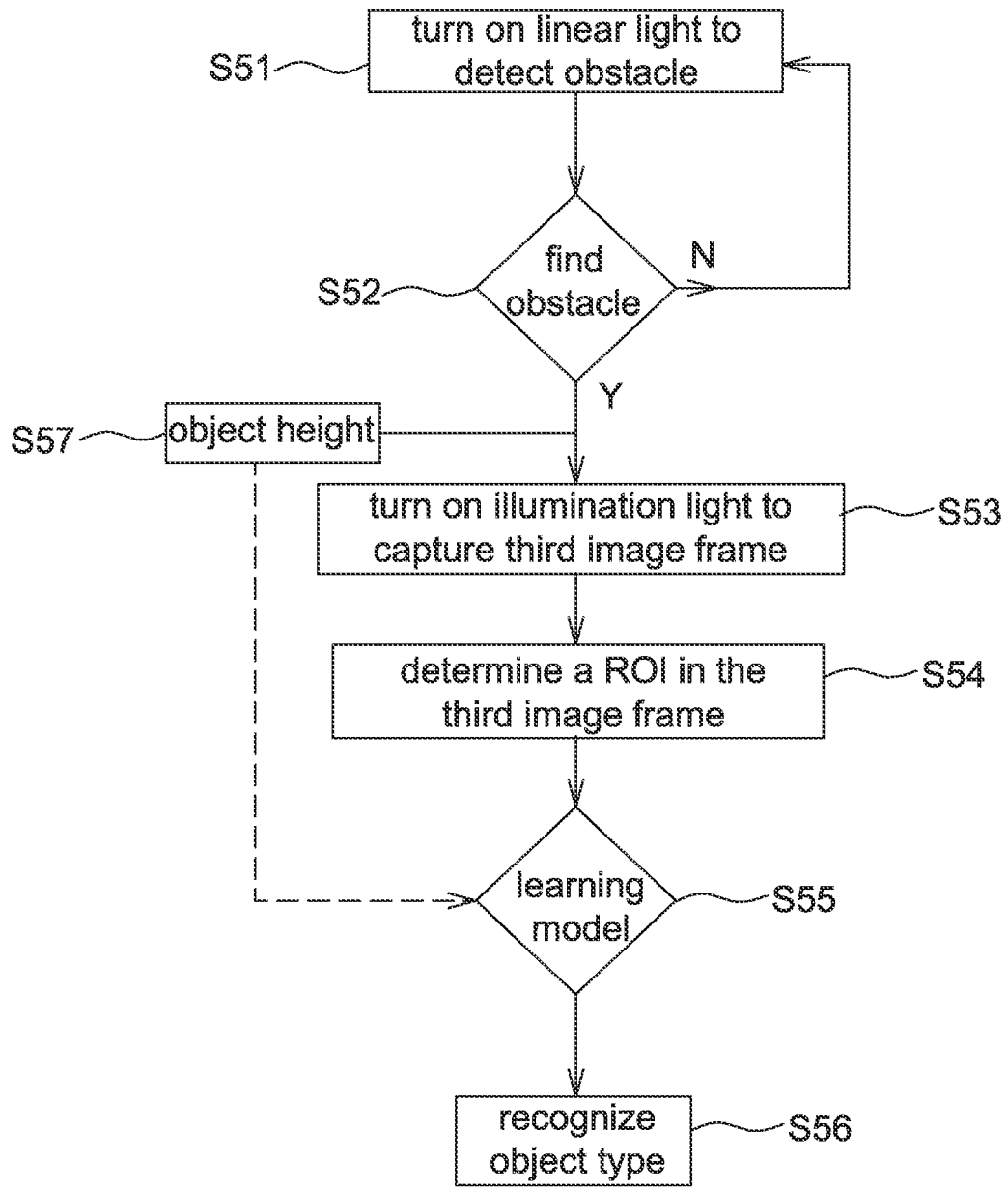
FIG. 5 is a flow chart of an operating method of a mobile robot according to a second embodiment of the present disclosure.

Referring to FIG. 5, it is a flow chart of an operating method of a mobile robot 100 according to one embodiment of the present disclosure, the method including the steps of: turning on linear light to detect an obstacle (Step S51); identifying whether an obstacle exists (Step S52); when there is no obstacle, moving back to Step S51 to continuous the detecting; whereas when there is one obstacle, turning on illumination light to capture a third image frame (Step S53); determining a region of interest (ROI) in the third image frame (Step S54); and using a learning model to recognize an object type (Steps S55-S56). This embodiment further includes an optional step: detecting an object height as an auxiliary in recognizing the object type (Step S57).

In this embodiment, the linear light includes, for example, the first light source LS1 as well as the second light source LS21 and LS22 mentioned above. The illumination light includes, for example, the third light source LS3 mentioned above. It is appreciated that positions of every light source shown in FIG. 1A is only intended to illustrate but not to limit the present disclosure.

Step S51: The processor 13 respectively controls the first light source LS1 as well as the second light source LS21 and LS22 to light up, for example, at the first time interval T1 and the second time interval T2 as shown in FIG. 4. Meanwhile, the processor 13 controls the optical sensor 11 to capture a first image frame and a second image frame respectively within the first time interval T1 and the second time interval T2.

Step S52: When identifying that the first image frame contains the broken line as shown in FIG. 6A or the second image frame contains the broken line as shown in FIG. 6B, the processor 13 identifies that there is an obstacle in front. The procedure then enters the Step S53; on the contrary, when the processor 13 identifies that both the first and second image frames do not contain any broken line, the Step S51 is entered to continuously detect an obstacle.

When identifying that the first image frame or the second image frame contains the broken line, the processor 13 further records (e.g., in the memory) a position of broken line as the object position.

Step S53: The processor 13 then controls the third light source LS3 to turn on, e.g., at the third time interval T3 shown in FIG. 2. The processor 13 also controls the optical sensor 11 to capture a third image frame, which contains at least one object image, within the third time interval T3. In an aspect that the processor 13 recognizes the object using a single image, the processor 13 controls the third light source LS3 to turn on for one third time interval V3. In one aspect, after the third time interval T3, the processor 13 controls the first light source LS1 as well as the second light sources LS21 and LS22 to operate using the timing shown in FIG. 4. In another aspect, after the third time interval T3, the processor 13 controls all light sources to turn off for a predetermined time interval to prevent detecting the same obstacle repeatedly and then operate using the timing shown in FIG. 4.

Step S54: The processor 13 then determines the ROI in the third image frame. The ROI is at the object position determined in the Step S52. As mentioned above, a size of the ROI is determined previously or determined according to a width W of the broken line in the first image frame (as shown in FIG. 6A) and a height H of the broken line in the second image frame (as shown in FIG. 6B).

Steps S55-S56: Finally, the processor 13 recognizes the object image within the ROI using the learning model trained before shipment to identify an object type.

Step S57: To increase the recognition correctness, when identifying an obstacle in the Step S52, the processor 13 further identifies an object height according to the second image frame, e.g., according to H in FIG. 6B. The identified object height helps the learning model to categorize and recognize the object type. The step S57 is selectively implemented.

After the object type is recognized, the processor 13 bypasses or dodges specific obstacles or directly moves across some obstacles according to previously determined rules. The operation after the object type being recognized is set according to different applications without particular limitations.

It should be mentioned that although the above embodiments are described in the way that the second light sources LS21 and LS22 are turned on and off together, the present disclosure is not limited thereto. In other aspects, LS21 and LS22 are turned on sequentially (and optical sensor capturing images correspondingly) as long as LS21 and LS22 respectively project a longitudinal light section toward the moving direction.

Figure 7:
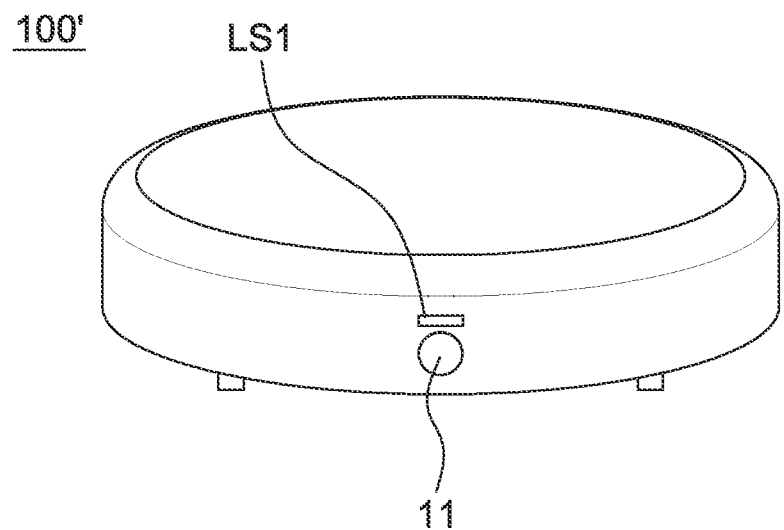
FIG. 7 is a solid diagram of a mobile robot according to another embodiment of the present disclosure.
Figure 9:
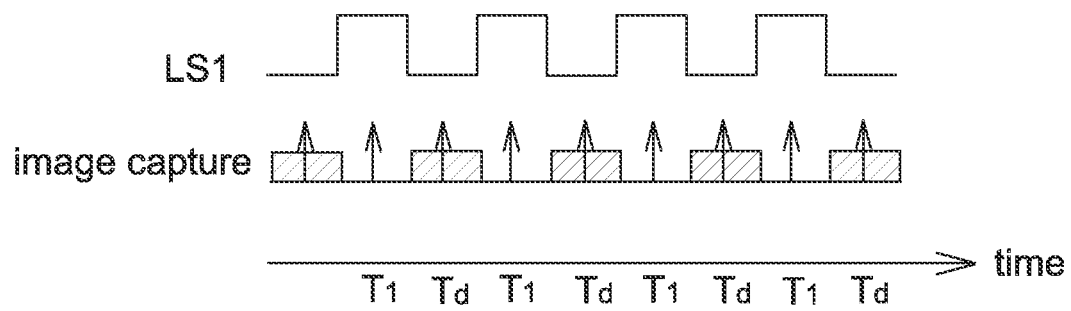
FIG. 9 is an operational timing diagram of a mobile robot according to another embodiment of the present disclosure.

Please refer to FIG. 7, it is a solid diagram of a mobile robot 100' according to another embodiment of the present disclosure. The mobile robot 100' includes a first light source LS1 and an optical sensor 11, which are identical to those mentioned above and shown in FIG. 1A. That is, the first light source LS1 projects a transverse light section toward a moving direction at a first time interval T1 as shown in FIG. 9. The optical sensor 11 captures a first image frame containing a light section image (e.g., as shown in FIG. 6A) within the first time interval T1.

Figure 8:
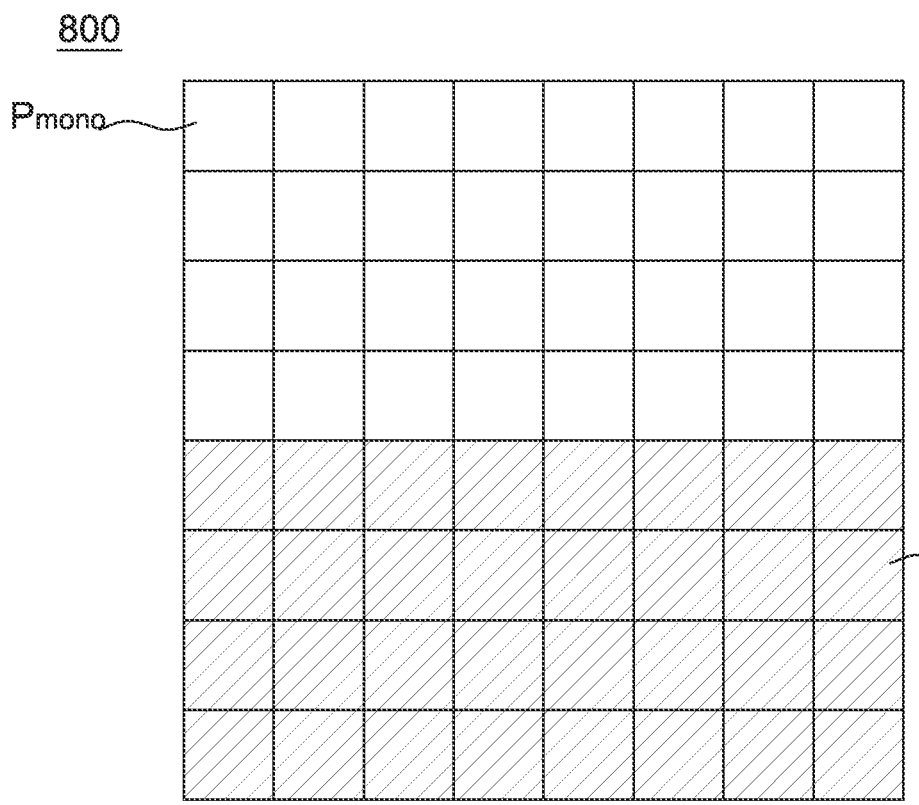
FIG. 8 is a schematic diagram of a pixel array of a mobile robot according to another embodiment of the present disclosure.

In this embodiment, the optical sensor 11 includes a pixel array 800 as shown in FIG. 8. That is, an upper part (i.e. blank region) of the pixel array 800 is not coated with an IR pass filter (or not coated with any filter) and a lower part (i.e. the region filled with slant lines) of the pixel array 800 is coated with an IR pass filter such that the upper part of the pixel array 800 can receive light of all spectrums in the environment, but the lower part of the pixel array 800 is mainly used to detect light section projected by the first light source LS1.

The method of forming an IR pass filter on the pixel is known to the art and thus details thereof are not described herein.

In the present disclosure, the upper part of the pixel array 800 is defined as a part of (having multiple pixels) the pixel array 800 close to a top surface of the mobile robot 100', and the lower part of the pixel array 800 is defined as a part of (having multiple pixels) the pixel array 800 close to a bottom surface of the mobile robot 100' after the pixel array 800 is arranged on the mobile robot 100'.

It should be mentioned that although FIG. 8 shows that the upper part and the lower part of the pixel array 800 are respectively a half of the pixel array 800, the present disclosure is not limited thereto. According to the arranged position of the optical sensor 11 on the mobile robot 100' and a field of view (FOV) of the optical sensor 11, the upper part or the lower part is larger than a half of the pixel array 800.

Figure 10:
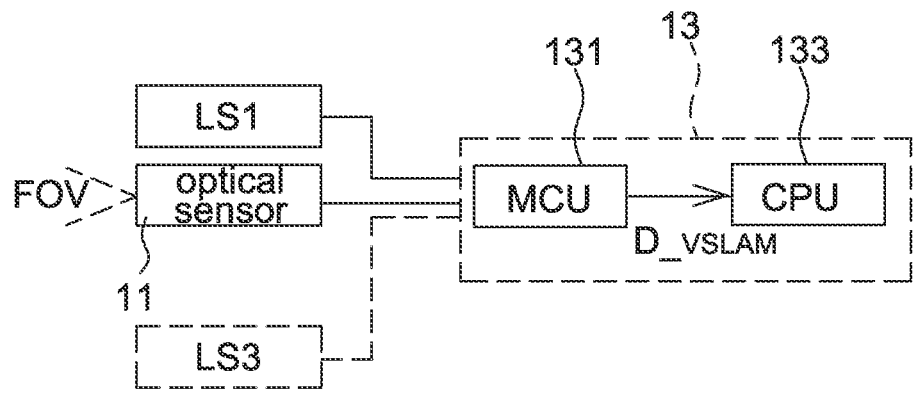
FIG. 10 is a schematic block diagram of a mobile robot according to another embodiment of the present disclosure.

Please refer to FIG. 10, it is a schematic block diagram of a mobile robot 100' (and 100" shown in FIG. 11) according to the embodiment of the present disclosure. The mobile robot 100' further includes a processor 13 electrically coupled to the first light source LS1 and the optical sensor 11. The processor 13 uses hardware and/or firmware to implement functions thereof.

In this embodiment, the processor 13 performs range estimation using pixel data corresponding to the lower part of the pixel array 800, and performs visual simultaneous localization and mapping (VSLAM) using pixel data corresponding to the upper part of the pixel array 800. Meanwhile, the processor 13 performs the range estimation without using the pixel data corresponding to the upper part of the pixel array 800, and performs the VSLAM without using the pixel data corresponding to the lower part of the pixel array 800.

The definition of the range estimation has been described above, and thus details thereof are not repeated herein.

In one aspect, both the range estimation and the VSLAM are performed or executed by a micro controller unit (MCU) 131 embedded in the optical sensor 11.

In another aspect, the processor 13 includes the MCU 131 and a central processing unit (CPU) 133 that is coupled to the MCU 131 (e.g., not in the optical sensor 11). The CPU 133 is used to control operations of the mobile robot 100'. Because the range estimation needs fewer computation but the VSLAM needs more computation, the MCU 131 is arranged to perform the range estimation but the CPU 133 is arranged to perform the VSLAM so as to improve the efficiency of processing pixel data. More specifically, when the MCU 131 receives the pixel data from the upper part of the pixel array 800, the MCU 131 transfers the pixel data corresponding to the upper part of the pixel array 800 to the CPU 133 for the calculation, and the MCU 131 processes only the pixel data corresponding to the lower part of the pixel array 800.

Please refer to FIG. 9 again, in order to remove noises in the first image frame, the first light source LS1 is controlled (e.g., by the processor 13) not to project the transverse light section at a dark interval Td. Meanwhile, the optical sensor 11 further captures a dark image frame (e.g., shown as rectangles filled with slant lines) within the dark interval Td. The processor 13 further substrates the dark image frame from the first image frame to form a difference image frame, and performs the range estimation using pixel data in the difference image frame corresponding to the lower part of the pixel array 800.

To further reduce the computation, the processor 13 substrates pixel data in the dark image frame only corresponding to the lower part of the pixel array 800 from the pixel data in the first image frame only corresponding to the lower part of the pixel array 800. That is, the processor 13 does not calculate the subtraction using the pixel data from the upper part of the pixel array 800.

It is possible that the mobile robot 100' includes a frame buffer to store the first image frame.

In the embodiment of FIG. 7, the processor 13 further identifies ambient light intensity using the pixel data corresponding to the upper part of the pixel array 800, and stops performing the VSLAM when the ambient light intensity is identified to be lower than a brightness threshold. That is, when the ambient light intensity is lower than the brightness threshold, the processor 13 does not process the pixel data corresponding to the upper part of the pixel array, but still performs the range estimation using the pixel data corresponding to the lower part of the pixel array 800.

The processor 13 is embedded with two algorithms respectively for performing the range estimation and the VSLAM, such that it is possible to stop one of the range estimation and the VSLAM.

Figure 11:
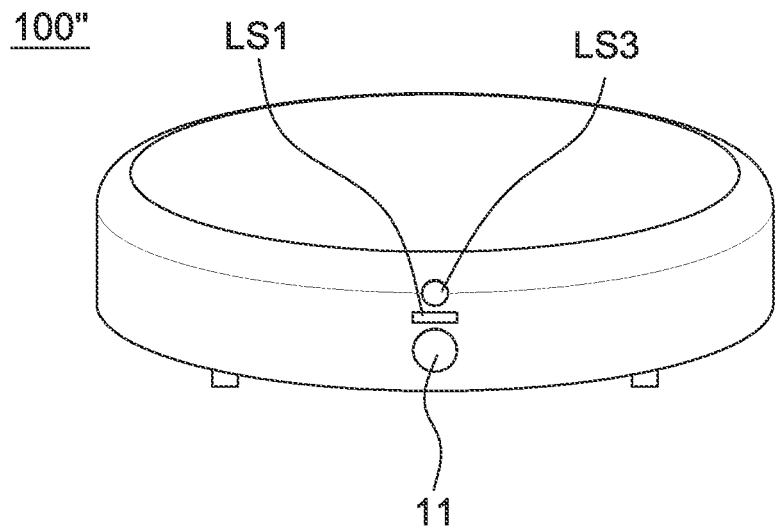
FIG. 11 is a solid diagram of a mobile robot according to an alternative embodiment of the present disclosure.
Figure 12:
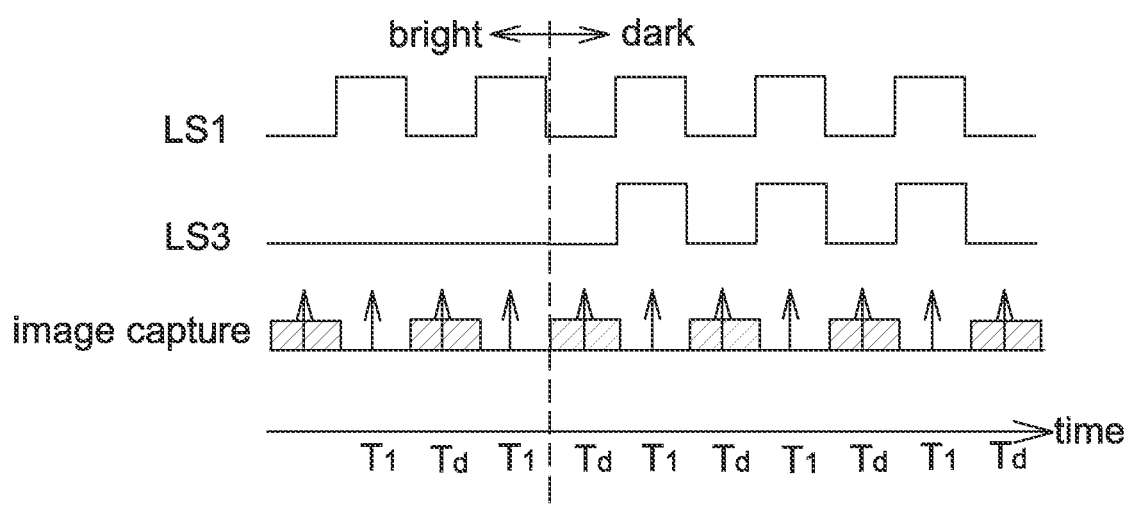
FIG. 12 is an operational timing diagram of a mobile robot according to an alternative embodiment of the present disclosure.

Please refer to FIG. 11, it is a solid diagram of a mobile robot 100" according to an alternative embodiment of the present disclosure. The mobile robot 100" includes a first light source LS1 and an optical sensor 11, which are identical to those mentioned above and shown in FIG. 1A. That is, the first light source projects a transverse light section toward a moving direction at a first time interval T1 as shown in FIG. 12. The optical sensor 11 captures a first image frame containing a light section image (e.g., as shown in FIG. 6A) within the first time interval T1. Similarly, the optical sensor 11 of this embodiment includes a pixel array 800 with an upper part thereof not being coated with an IR pass filter (or not coated with any filter) and a lower part thereof being coated with an IR pass filter as shown in FIG. 8 and mentioned above.

In this alternative embodiment, the mobile robot 100" further includes a third light source LS3 for illuminating a front area of the moving direction. The function of the third light source LS3 is similar to that in FIG. 1A only that the third light source LS3 here is a light emitting diode for illuminating white light. Preferably, spectrum of the third light source LS3 has attenuated IR spectrum.

The mobile robot 100" also includes a processor 13, as shown in FIG. 10, electrically coupled to the first light source LS1, the third light source LS3 and the optical sensor 11.

As mentioned above, the processor 13 performs range estimation using pixel data corresponding to the lower part of the pixel array 800, performs visual simultaneous localization and mapping (VSLAM) using pixel data corresponding to the upper part of the pixel array 800, and identifies ambient light intensity using the pixel data corresponding to the upper part of the pixel array 800.

Since the mobile robot 100" further includes a third light source LS3, when the detected ambient light intensity (e.g., averaged pixel data) is higher than a brightness threshold (e.g., left side of the dashed line shown in FIG. 12), the processor 13 deactivates the third light source LS3; and when the detected ambient light intensity is lower than the brightness threshold (e.g., right side of the dashed line shown in FIG. 12), the processor 13 controls the third light source LS3 to illuminate the front area corresponding to the first time interval T1 as shown in FIG. 12 or to steadily illuminate the front area without being turned on and off alternatively. More specifically, the third light source LS3 is used to compensate light for the VSLAM operation.

As mentioned in the embodiment of FIG. 7, the processor 13 stops the VSLAM when the ambient light is weak. However in this embodiment of FIG. 11, the VSLAM is continuously performed by turning on the third light source LS3 when the ambient light is weak.

Other functions of the processor 13 are identical to those of the embodiment in FIG. 7. For example, both the range estimation and the VSLAM are performed by the MCU 131, or respectively performed by the MCU 131 and the CUP 133 as mentioned above.

Similarly, the first light source LS1 does not project the transverse light section at a dark interval Td as shown in FIG. 12. The optical sensor 11 captures a dark image frame (e.g., shown as rectangles filled with slant lines) within the dark interval Td. The processor 13 then substrates the dark image frame from the first image frame to form a difference image frame, and performs the range estimation using pixel data in the difference image frame corresponding to the lower part of the pixel array 800. As mentioned above, the processor 13 may perform the subtraction only using the pixel data corresponding to the lower part of the pixel array 800 without processing the pixel data corresponding to the upper part of the pixel array 800.

Similarly, in this alternative embodiment, the processor 13 performs the range estimation without using the pixel data corresponding to the upper part of the pixel array 800, and performs the VSLAM without using the pixel data corresponding to the lower part of the pixel array 800.

In addition, a number of first light source, the second light source and the third light source is not limited to those shown in FIG. 1A. The first light source, the second light source and the third light source may respectively include multiple light sources to turn on and off simultaneously.

In the present disclosure, the "transverse" is referred to substantially parallel to a moving surface (e.g., the ground), and the "longitudinal" is referred to substantially perpendicular to the moving surface. The object on the moving path is called the obstacle.

As mentioned above, the conventional cleaning robot adopts multiple types of sensors to respectively implement different detecting functions, and has the issues of high computation loading, time and consumption power as well as low recognition correctness. Accordingly, the present disclosure further provides a mobile robot suitable to smart home (e.g. FIGS. 1 and 2) and an operating method thereof (e.g. FIG. 5) that achieve the objective of obstacle avoidance, positioning and object recognition according to the detection result of a single image sensor.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A mobile robot, comprising:
a first light source, configured to project a transverse light section toward a moving direction at a first time interval;
an optical sensor, configured to capture a first image frame within the first time interval, and comprising:
a pixel array, an upper part of the pixel array not being coated with any filter and a lower part of the pixel array being coated with an IR pass filter; and
a processor, electrically coupled to the first light source and the optical sensor, and configured to
perform range estimation using pixel data corresponding to the lower part of the pixel array, and
perform visual simultaneous localization and mapping (VSLAM) using pixel data corresponding to the upper part of the pixel array.

2. The mobile robot as claimed in claim 1, wherein
the first light source is further configured to not project the transverse light section at a dark interval,
the optical sensor is further configured to capture a dark image frame within the dark interval, and
the processor is further configured to substrate the dark image frame from the first image frame to form a difference image frame, and perform the range estimation using pixel data in the difference image frame corresponding to the lower part of the pixel array.

3. The mobile robot as claimed in claim 2, wherein the processor is configured to substrate pixel data in the dark image frame only corresponding to the lower part of the pixel array from the pixel data in the first image frame only corresponding to the lower part of the pixel array.

4. The mobile robot as claimed in claim 1, wherein the upper part and the lower part of the pixel array are respectively a half of the pixel array.

5. The mobile robot as claimed in claim 1, wherein the processor is further configured to
identify ambient light intensity using the pixel data corresponding to the upper part of the pixel array, and
stop performing the VSLAM when the ambient light intensity is lower than a brightness threshold.

6. The mobile robot as claimed in claim 5, wherein when the ambient light intensity is lower than the brightness threshold,
the processor is configured to not process the pixel data corresponding to the upper part of the pixel array, but is still configured to perform the range estimation using the pixel data corresponding to the lower part of the pixel array.

7. The mobile robot as claimed in claim 1, wherein the processor comprises:
a micro controller unit (MCU) configured to perform the range estimation; and
a central processing unit (CPU) configured to perform the VSLAM,
wherein the MCU is embedded in the optical sensor, and the CPU is coupled to the MCU and configured to control operations of the mobile robot.

8. The mobile robot as claimed in claim 1, wherein the processor is configured to
perform the range estimation without using the pixel data corresponding to the upper part of the pixel array, and
perform the VSLAM without using the pixel data corresponding to the lower part of the pixel array.

9. A mobile robot, comprising:
a first light source, configured to project a transverse light section toward a moving direction at a first time interval;
a third light source, configured to illuminate a front area of the moving direction;
an optical sensor, configured to capture a first image frame within the first time interval, and comprising:

a pixel array, an upper part of the pixel array not being coated with any filter and a lower part of the pixel array being coated with an IR pass filter; and a processor, electrically coupled to the first light source, the third light source and the optical sensor, and configured to perform range estimation using pixel data corresponding to the lower part of the pixel array, perform visual simultaneous localization and mapping (VSLAM) using pixel data corresponding to the upper part of the pixel array, and identify ambient light intensity using the pixel data corresponding to the upper part of the pixel array.

10. The mobile robot as claimed in claim 9, wherein when the ambient light intensity is higher than a brightness threshold, the processor deactivates the third light source, and when the ambient light intensity is lower than the brightness threshold, the processor controls the third light source to illuminate the front area corresponding to the first time interval.

11. The mobile robot as claimed in claim 9, wherein when the ambient light intensity is higher than a brightness threshold, the processor deactivates the third light source, and when the ambient light intensity is lower than the brightness threshold, the processor controls the third light source to steadily illuminate the front area.

12. The mobile robot as claimed in claim 9, wherein the upper part and the lower part of the pixel array are respectively a half of the pixel array.

13. The mobile robot as claimed in claim 9, wherein the processor comprises:

a micro controller unit (MCU) configured to perform the range estimation; and a central processing unit (CPU) configured to perform the VSLAM, wherein the MCU is embedded in the optical sensor, and the CPU is coupled to the MCU and configured to control operations of the mobile robot.

14. The mobile robot as claimed in claim 9, wherein the first light source is further configured to not project the transverse light section at a dark interval, the optical sensor is further configured to capture a dark image frame within the dark interval, and the processor is further configured to substrate the dark image frame from the first image frame to form a difference image frame, and perform the range estimation using pixel data in the difference image frame corresponding to the lower part of the pixel array.

15. The mobile robot as claimed in claim 14, wherein the processor is configured to substrate pixel data in the dark image frame only corresponding to the lower part of the pixel array from the pixel data in the first image frame only corresponding to the lower part of the pixel array.

16. The mobile robot as claimed in claim 9, wherein the first light source comprises an IR laser diode, and the third light source comprises a light emitting diode illuminating white light.

17. The mobile robot as claimed in claim 9, wherein the processor is configured to perform the range estimation without using the pixel data corresponding to the upper part of the pixel array, and perform the VSLAM without using the pixel data corresponding to the lower part of the pixel array.

* * * * *

UNITED STATES PATENT AND TRADEMARK OFFICE
CERTIFICATE OF CORRECTION

PATENT NO. : 11,821,985 B2
APPLICATION NO. : 17/342044
DATED : November 21, 2023
INVENTOR(S) : Guo-Zhen Wang et al.

It is certified that error appears in the above-identified patent and that said Letters Patent is hereby corrected as shown below:

On the Title Page

Related U.S. Application Data should be listed as the followings:
Related U.S. Application Data
(60) Continuation-in-part of application No. 16/929,232, filed on Jul. 15, 2020, now Pat. No. 11,691,264, which is a continuation-in-part of application No. 16/425,955, filed on May 30, 2019, now Pat. No. 11,510,539, which is a continuation-in-part of application No. 15/841,376, filed on Dec. 14, 2017, now Pat. 10,627,518,
Continuation-in-part of application No. 17/185,263, filed on Feb. 25, 2021, now Pat No. 11,307,308, which is a division of application No. 16/800,187, filed on Feb. 25, 2020, now Pat. no. 10,962,646, which is a continuation of application No. 15/841,376, filed on Dec. 14, 2017, now Pat. No. 10,627,518.

Signed and Sealed this
Twentieth Day of February, 2024

Katherine Kelly Vidal
*Director of the United States Patent and Trademark Office*